United States Patent
Buisson

(10) Patent No.: US 9,242,782 B2
(45) Date of Patent: Jan. 26, 2016

(54) VISUAL VACUUM INDICATOR

(75) Inventor: Gerard Laurent Buisson, Cincinnati, OH (US)

(73) Assignee: The Folger Coffee Company, Orrville, OH (US)

( * ) Notice: Subject to any disclaimer, the term of this patent is extended or adjusted under 35 U.S.C. 154(b) by 494 days.

(21) Appl. No.: 12/248,061

(22) Filed: Oct. 9, 2008

(65) Prior Publication Data

US 2009/0110777 A1 Apr. 30, 2009

Related U.S. Application Data

(60) Provisional application No. 60/998,091, filed on Oct. 9, 2007, provisional application No. 60/998,195, filed on Oct. 9, 2007.

(51) Int. Cl.
| | | |
|---|---|---|
| *B65D 79/00* | (2006.01) | |
| *B65D 43/02* | (2006.01) | |
| *B65D 51/16* | (2006.01) | |

(Continued)

(52) U.S. Cl.
CPC .......... *B65D 79/005* (2013.01); *B65D 43/0212* (2013.01); *B65D 51/1683* (2013.01); *B65D 51/20* (2013.01); *B29C 45/1628* (2013.01); *B29C 45/1676* (2013.01); *B29L 2031/265* (2013.01); *B29L 2031/56* (2013.01); *B29L 2031/565* (2013.01); *B65D 2203/12* (2013.01); *B65D 2251/0018* (2013.01); *B65D 2251/0093* (2013.01); *B65D 2543/0062* (2013.01); *B65D 2543/00092* (2013.01); *B65D 2543/00231* (2013.01); *B65D 2543/00296* (2013.01); *B65D 2543/00351* (2013.01); *B65D 2543/00407* (2013.01); *B65D 2543/00537* (2013.01); *B65D 2543/00685* (2013.01);

(Continued)

(58) Field of Classification Search
CPC .......................... B65D 79/005; B65D 2203/12
USPC ............ 426/87; 428/35.5; 215/303, 305, 341, 215/343, 344, 345, 352; 220/378, 614, 798, 220/803, 804, 806
See application file for complete search history.

(56) References Cited

U.S. PATENT DOCUMENTS

| | | | |
|---|---|---|---|
| 682,995 | A | 9/1901 | Patterson |
| 770,751 | A | 9/1904 | Hull |

(Continued)

FOREIGN PATENT DOCUMENTS

| | | |
|---|---|---|
| EP | 1767463 | 3/2007 |
| EP | 2205499 | 6/2012 |

(Continued)

OTHER PUBLICATIONS

JP 3070008 B2 machine translation from Japanese Patent Office.*

(Continued)

*Primary Examiner* — Erik Kashnikow
*Assistant Examiner* — Chaim Smith
(74) *Attorney, Agent, or Firm* — Calfee, Halter & Griswold, LLP

(57) ABSTRACT

A packaging system for roast and ground coffee is disclosed. The packaging system can comprise a container, an overcap, and a visual indicator. The visual indicator can indicate a pressure difference between the inside of the packaging system and the outside of the packaging system by moving from a concave outwardly position to a concave inwardly position. The visual indicator can comprise a bubble.

9 Claims, 5 Drawing Sheets

(51) Int. Cl.
  *B65D 51/20* (2006.01)
  *B29C 45/16* (2006.01)
  *B29L 31/26* (2006.01)
  *B29L 31/56* (2006.01)

(52) U.S. Cl.
  CPC ............... *B65D 2543/00731* (2013.01); *B65D 2543/00796* (2013.01); *B65D 2543/00972* (2013.01)

(56) References Cited

U.S. PATENT DOCUMENTS

| | | | |
|---|---|---|---|
| 1,109,484 A | 9/1914 | Taliaferro | |
| 1,134,067 A | 3/1915 | Hull | |
| 1,242,510 A | 10/1917 | Anderson | |
| 1,413,257 A | 4/1922 | Carvalho | |
| 1,463,360 A | 7/1923 | Foote et al. | |
| 1,488,567 A | 4/1924 | Taliaferro | |
| 1,625,963 A | 4/1927 | Snyder | |
| 1,671,903 A | 5/1928 | Jaeger | |
| 1,908,245 A | 5/1933 | Hogg | |
| 1,909,406 A | 5/1933 | Holland | |
| 2,074,830 A | 3/1937 | Conner et al. | |
| 2,079,813 A | 5/1937 | Podel | |
| 2,238,105 A | 4/1941 | Fison et al. | |
| 2,308,126 A | 1/1943 | Stover et al. | |
| 2,348,014 A | 5/1944 | Mallard | |
| 2,365,737 A | 12/1944 | White et al. | |
| 2,394,135 A | 2/1946 | Baar et al. | |
| 2,406,568 A | 8/1946 | Sebel | |
| 2,492,144 A | 12/1949 | Gora | |
| 2,670,868 A | 3/1954 | Stover et al. | |
| 2,700,186 A | 1/1955 | Stover | |
| 3,004,297 A | 10/1961 | Stover | |
| 3,004,298 A | 10/1961 | Haynie | |
| 3,067,899 A | 12/1962 | Everett | |
| 3,077,409 A * | 2/1963 | Baselt | 426/118 |
| 3,216,601 A | 11/1965 | Wheaton | |
| 3,269,141 A * | 8/1966 | Weiss | 62/294 |
| 3,286,868 A | 11/1966 | Mumford | |
| 3,305,119 A | 2/1967 | Reynolds et al. | |
| 3,305,120 A | 2/1967 | Owen et al. | |
| 3,360,153 A | 12/1967 | Wheaton et al. | |
| 3,490,139 A | 1/1970 | McKinven, Jr. | |
| 3,514,004 A | 5/1970 | Hammersmith | |
| 3,603,472 A | 9/1971 | Lecinski, Jr. et al. | |
| 3,612,547 A | 10/1971 | Kan | |
| 3,664,544 A | 5/1972 | Hammes | |
| 3,687,334 A | 8/1972 | McNeil | |
| 3,731,834 A | 5/1973 | Stuard | |
| 3,746,199 A | 7/1973 | Hart et al. | |
| 3,812,992 A | 5/1974 | Wolf et al. | |
| 3,842,574 A | 10/1974 | Dickey | |
| 3,851,794 A | 12/1974 | Hehl et al. | |
| 3,875,654 A | 4/1975 | Ushijima | |
| 3,892,351 A | 7/1975 | Johnson et al. | |
| 3,960,287 A | 6/1976 | Baker | |
| 3,973,719 A | 8/1976 | Johnson et al. | |
| 4,094,436 A | 6/1978 | Birmingham | |
| 4,206,499 A | 6/1980 | Urbanek et al. | |
| 4,223,800 A | 9/1980 | Fishman | |
| 4,227,618 A | 10/1980 | Zipper | |
| 4,301,941 A | 11/1981 | Kraft | |
| 4,363,420 A | 12/1982 | Andrews | |
| 4,373,317 A | 2/1983 | Egli | |
| 4,423,822 A | 1/1984 | Powalowski | |
| 4,489,844 A | 12/1984 | Breskin | |
| 4,511,053 A | 4/1985 | Brandes et al. | |
| 4,560,076 A | 12/1985 | Boik | |
| 4,562,936 A | 1/1986 | Deflander | |
| 4,588,105 A | 5/1986 | Schmitz et al. | |
| 4,607,757 A | 8/1986 | Lecinski | |
| 4,610,367 A | 9/1986 | Massott et al. | |
| 4,616,759 A | 10/1986 | Mahler | |
| 4,679,696 A | 7/1987 | Bonnenfant et al. | |
| 4,702,384 A | 10/1987 | Weiser | |
| 4,787,530 A | 11/1988 | Edwards | |
| 4,851,176 A | 7/1989 | Christiansen et al. | |
| 4,865,209 A | 9/1989 | Bush | |
| 4,988,472 A | 1/1991 | Orimoto et al. | |
| 5,035,798 A | 7/1991 | Stenger | |
| 5,190,177 A | 3/1993 | Collins | |
| 5,217,133 A | 6/1993 | Timson et al. | |
| 5,255,805 A | 10/1993 | Weiss et al. | |
| 5,356,026 A | 10/1994 | Andress et al. | |
| 5,395,003 A | 3/1995 | Matsuda | |
| 5,395,005 A | 3/1995 | Yoshida | |
| 5,443,172 A | 8/1995 | Gabriele | |
| 5,445,291 A | 8/1995 | Daniel | |
| 5,458,252 A | 10/1995 | Logel | |
| 5,540,344 A | 7/1996 | Rosenthal et al. | |
| 5,685,443 A | 11/1997 | Taber et al. | |
| 5,791,506 A | 8/1998 | Sheffler et al. | |
| 5,839,881 A | 11/1998 | Yu | |
| 5,868,273 A | 2/1999 | Daenen et al. | |
| 5,911,334 A | 6/1999 | Helms | |
| 5,992,660 A | 11/1999 | Miura et al. | |
| 6,053,353 A | 4/2000 | Helms | |
| 6,142,325 A | 11/2000 | Chomik | |
| 6,196,451 B1 | 3/2001 | Helms | |
| 6,364,152 B1 * | 4/2002 | Poslinski et al. | 220/788 |
| 6,371,319 B2 | 4/2002 | Yeaton et al. | |
| 6,460,720 B1 | 10/2002 | Massey et al. | |
| 6,481,589 B2 | 11/2002 | Blomdahl et al. | |
| 6,523,713 B1 | 2/2003 | Helms | |
| 6,581,939 B1 | 6/2003 | Theros et al. | |
| 6,662,958 B2 | 12/2003 | German et al. | |
| 6,691,468 B2 | 2/2004 | Helferty | |
| 6,974,046 B2 | 12/2005 | Shenkar | |
| 7,007,817 B2 | 3/2006 | Jochem | |
| 7,010,885 B2 | 3/2006 | Helferty | |
| 7,083,058 B2 | 8/2006 | Perry et al. | |
| 7,097,790 B2 | 8/2006 | Jochem | |
| 7,134,565 B1 | 11/2006 | Wan et al. | |
| 7,169,418 B2 | 1/2007 | Dalton et al. | |
| 7,169,419 B2 | 1/2007 | Dalton et al. | |
| 7,175,039 B2 | 2/2007 | German et al. | |
| 7,390,043 B2 | 6/2008 | Kraus | |
| 7,455,192 B2 | 11/2008 | Siragusa | |
| 7,527,161 B2 | 5/2009 | Rodriguez et al. | |
| 7,766,178 B2 | 8/2010 | Robinson et al. | |
| 7,784,629 B2 | 8/2010 | German et al. | |
| 7,815,061 B1 | 10/2010 | Robinson et al. | |
| 7,946,438 B2 | 5/2011 | Dobbelstein et al. | |
| 7,997,437 B2 | 8/2011 | Jatzke et al. | |
| 8,109,396 B1 | 2/2012 | Robinson et al. | |
| 8,218,296 B2 | 7/2012 | Rupp | |
| 8,596,477 B2 | 12/2013 | Kras et al. | |
| 2002/0113032 A1 | 8/2002 | Blomdahl et al. | |
| 2003/0010787 A1 | 1/2003 | Dalton et al. | |
| 2003/0093955 A1 | 5/2003 | Helferty | |
| 2003/0102281 A1 | 6/2003 | Ryall et al. | |
| 2004/0011759 A1 | 1/2004 | Hahn et al. | |
| 2004/0137110 A1 | 7/2004 | Dalton et al. | |
| 2004/0139660 A1 | 7/2004 | Helferty | |
| 2005/0061766 A1 | 3/2005 | Jochem | |
| 2005/0061812 A1 * | 3/2005 | Vilalta et al. | 220/212 |
| 2005/0062183 A1 | 3/2005 | Jochem | |
| 2005/0145593 A1 | 7/2005 | Simone et al. | |
| 2006/0091144 A1 | 5/2006 | Siragusa | |
| 2006/0102631 A1 | 5/2006 | Kraus | |
| 2006/0113272 A1 | 6/2006 | Rodriguez et al. | |
| 2007/0068892 A1 | 3/2007 | Kaufman | |
| 2007/0108155 A1 | 5/2007 | German et al. | |
| 2007/0187352 A1 | 8/2007 | Kras et al. | |
| 2007/0289936 A1 | 12/2007 | Pugne | |
| 2008/0073312 A1 | 3/2008 | Babcock et al. | |
| 2008/0105641 A1 | 5/2008 | Dobbelstein et al. | |
| 2009/0090721 A1 | 4/2009 | Buisson et al. | |
| 2009/0109607 A1 | 4/2009 | Rupp | |
| 2009/0110777 A1 | 4/2009 | Buisson | |

(56) References Cited

U.S. PATENT DOCUMENTS

2009/0232947 A1    9/2009  Buisson et al.
2010/0200588 A1*   8/2010  Bergman et al. ......... 220/203.01

FOREIGN PATENT DOCUMENTS

| JP | 2000-153881 A   | 6/2000  |
|----|-----------------|---------|
| JP | 3070008 B2 *    | 7/2000  |
| JP | 2000-226058     | 8/2000  |
| JP | 2001-315825     | 11/2001 |
| WO | 2007106676      | 9/2007  |
| WO | 2009047724      | 4/2009  |
| WO | 2009047725      | 4/2009  |

OTHER PUBLICATIONS

International Search Report for International Application No. PCT/IB2008/054143 dated Feb. 12, 2009.
Written Opinion for International Application No. PCT/IB2008/054143 dated Feb. 12, 2009.
International Search Report for International Application No. PCT/IB2008/054142 dated Sep. 10, 2009.
Written Opinion for International Application No. PCT/IB2008/054142 dated Sep. 10, 2009.
Amendment accompanying an Request for Continued Examination in response to Office Action dated Mar. 5, 2012 from U.S. Appl. No. 12/248,058, dated Jul. 3, 2012.
Office Action from U.S. Appl. No. 12/248,058, mailed Mar. 5, 2012.
Response to Office Action dated Jun. 22, 2011 from U.S. Appl. No. 12/248,058, dated Sep. 19, 2011.
Office Action from U.S. Appl. No. 12/248,058, dated Jun. 22, 2011.
Response to Office Action dated Apr. 13, 2012 from U.S. Appl. No. 12/248,058, dated May 12, 2011.
Office Action from U.S. Appl. No. 12/248,058 dated Apr. 13, 2011.
English translation of Notification of Second Examination Review from Chinese Patent Application No. 2008801116188, dated Feb. 29, 2012.
Response to First Office Action dated Mar. 22, 2011 from Chinese Patent Application No. 20880111618, dated Sep. 28, 2011.
Office Action from Chinese Patent Application No. 20880111618, dated Mar. 22, 2011.
Notification of Grant from European Patent Application No. 08 837 744.5-1261, dated Mar. 2, 2012.
Response to Office Action dated Oct. 6, 2011 from European Patent Application No. 08 837 744.5-1261, dated Feb. 13, 2012.
Statement of Opinion from Chinese Patent Application Serial No. 2000880120944.5, dated Oct. 17, 2011.
Submission (English translation not available) and the English claims to the First Office from Chinese Patent Application No. 20088120944.5, Oct. 17, 2011.
Text of First Office Action from Chinese Patent Application No. 200880120944.5, dated Apr. 2, 2011.
Notice of Grant from European Patent Application No. 08 837 101.1261, dated Apr. 17, 2012.
Response to Office Action dated Oct. 5, 2011 from European Patent Application No. 08 837 101.8-1261, dated Mar. 13, 2012.
Communication pursuant to Articles 94(3) from European Patent Application No. 08 837 101.801261 dated Oct. 5, 2011.
Office action from European Application No. 08837744.5 dated Oct. 6, 2011.
Office action from European Application No. 08837101.8 dated May 20, 2010.
Response to office action from European Application No. 08837744.5 dated Feb. 13, 2012.
Response to office action from European Application No. 08837101.8 dated Jun. 15, 2010.
Interview summary from U.S. Appl. No. 12/248,058 dated Aug. 10, 2011.
Office action from U.S. Appl. No. 12/248,058 dated Mar. 5, 2012.
Office action from U.S. Appl. No. 12/248,058 dated Jun. 22, 2011.
Response to Office Action from U.S. Appl. No. 12/248,058 dated Sep. 19, 2011.
Chinese Office Action from Chinese Patent Application No. 200880111618.8, Issued Nov. 2, 2012.
Japanese Office Action from JP Appln. No. 2010-528516, dated Dec. 25, 2012.
Japanese Office Action from JP Appln. No. 2010-528517, dated Jan. 22, 2013.
Official Notice of Rejection from Japanese Patent Apptication No. 2010-528517, mailed on Aug. 13, 2013; 2 pages.
Official Response (Amendment & Argument) to the Notice of Rejection filed with the Japanese Patent Office on Nov. 12, 2013; 11 pages.

* cited by examiner

A
VISUAL VACUUM INDICATOR

CROSS REFERENCE TO RELATED APPLICATIONS

This application claims priority to and the benefit of U.S. Provisional applications 60/998,091, filed on Oct. 9, 2007, and 60/998,195, filed on Oct. 9, 2007, both of which are hereby incorporated by reference herein in their entireties.

FIELD

The present invention generally relates to a packaging system useful for packing food products and more particularly relates to a roast and ground coffee packaging system having an overcap with a visual indicator.

BACKGROUND

Consumers generally want the appearance that food products, in particular roast and ground coffee, are fresh upon consuming. Packaging systems such as coffee containers, and in more particular plastic coffee containers such as those described in U.S. Pat. No. 7,169,418, assigned to The Procter & Gamble Company, are being used more and more to deliver coffee to consumers. With the increase of coffee sold to consumers in plastic containers, a consumer demand exists for indications that the coffee inside the container is fresh. Indicators of freshness, including visual indicators, provide the consumer with confidence that the coffee that they are about to consume will satisfy their desire for a pleasant cup of coffee. Consumers are aware that external environmental factors, such as air, including oxygen, affect the freshness and thus the taste of the roast and ground coffee. Current containers do not present these visual indicators to consumers to communicate to them that the container is providing not only a way to transport the roast and ground coffee but an indication that the roast and ground coffee is indeed fresh.

Further, it is known from consumer research that freshness is a critical consumer need in the coffee marketplace. In other words, fresh coffee equates to a great tasting cup of coffee. Currently, methods are used to process and pack coffee to ensure that the coffee is still fresh by the time the consumer buys it at a store. Once the coffee is purchased and taken to the place of storage and consumption, typically a consumer's home, the consumer still desires for the coffee to stay fresh in the container over the length of time that it takes to consume the entire amount of coffee. Unfortunately, the fit between the overcap and the container has not been tight enough to effectively "seal in" freshness by way of an airtight seal or even to "burp" the package, i.e. to push on the top of the overcap to force air out of the container and then sealing the overcap to the container so that a slight vacuum is maintained over time, indicating that no air is coming into the container. Even if the fit had been tight enough, it would have been difficult for the consumer to see the depressed overcap (due to the pressure differential, i.e. vacuum) because the pressure differential was small, and the surface area of the cap was large, thus resulting in a small deflection of the overcap.

Therefore, a need exists for a packaging system for roast and ground coffee that includes a visual indicator for indication of an airtight container as well as the presence of a vacuum inside the container. Thus, freshness of the roast and ground coffee is communicated to the consumer.

SUMMARY

To address the current needs, the present invention contemplates a packing system for roast and ground coffee. The packaging system comprises a container, a flexible overcap, and a visual indicator. The visual indicator indicates a pressure difference between the inside of the packaging system and the outside of the packaging system. The packaging system can also include a closure and a one-way valve. An air tight seal can be formed between the overcap and the container. In one embodiment, the overcap can be round. In another embodiment, the overcap can be nominally six inches in diameter.

In one embodiment, the visual indicator can be integral with the overcap. In another embodiment, the visual indicator can be at least partially concave inwardly to the interior of the container when a vacuum exists between the inside of the container and the outside of the container. In still another embodiment, the visual indicator can comprise a bubble portion and can further comprise a bump portion. The visual indicator can comprise a thermoplastic elastomer. In another embodiment, the visual indicator can have a first position and a second position, the first position comprising a bubble that is concave outwardly from the interior of the container, the second position being concave inwardly towards the interior of the container wherein the visual indicator assumes the second position when a vacuum exists inside the container.

In another embodiment, the packaging system can further comprise a gasket at the interface between the container and the overcap. The gasket can comprise a thermoplastic elastomer, which can be translucent.

In one embodiment, the overcap can be made from a plastic material selected from the group consisting of polycarbonate, low density polyethylene, high density polyethylene, polyethylene terephthalate, polypropylene, polystyrene, polyvinyl chloride, co-polymers thereof, and combinations thereof.

In another embodiment, the packaging system can further comprise roast and ground coffee within the container.

BRIEF DESCRIPTION OF THE DRAWINGS

While this specification includes a description of the present invention and concludes with claims that define the invention, it is believed that both will be better understood by reference to the drawings wherein:

DETAILED DESCRIPTION

Figure 1:
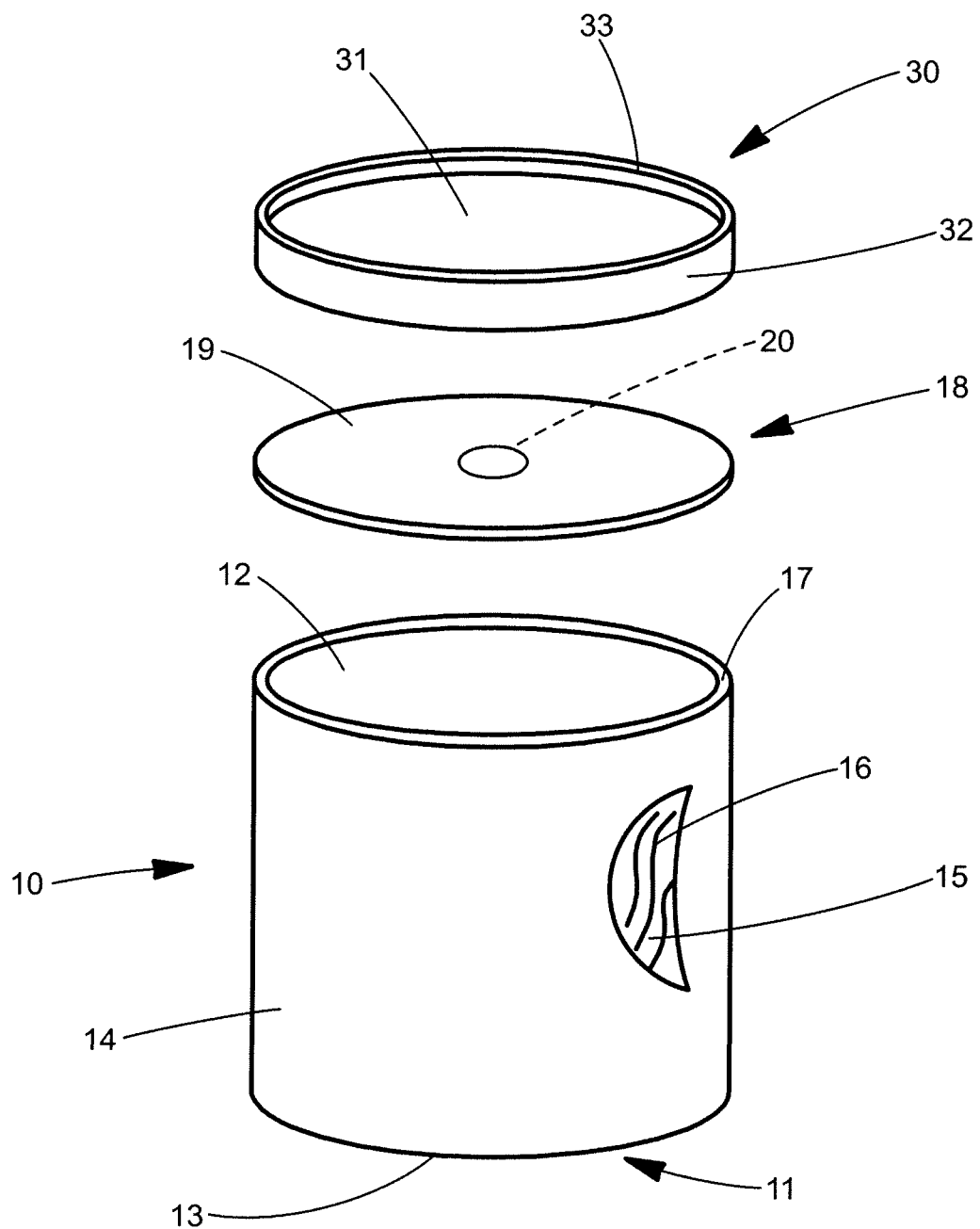
FIG. 1 is an exploded perspective view of a packaging system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Such alterations and further modifications in the illustrated device and such further applications of the principles of the invention as illustrated therein as would normally occur to one skilled in the art to which the invention relates are contemplated as within the scope of the invention.

Although the invention herein will generally be described in terms of a package for a food product, such as roast and ground coffee, it should be understood that any suitable packaging system for a food product is within the scope of the present invention. A visual indicator as used and described herein may be useful and advantageous for any product where it is valuable, or at least desirable, to indicate the presence of a vacuum on the interior of a container.

As used herein, the articles including "the", "a" and "an" when used in a claim or in the specification, are understood to mean one or more of what is claimed or described.

As used herein, the terms "include", "includes" and "including" are meant to be non-limiting.

As used herein the term "burp" or "burping" of the packaging system is defined as when an end user or consumer pushes on the top of an overcap of a packaging system in accordance with one embodiment of the present invention to force air out of a container and then subsequent sealing or attaching of the overcap to the container so that a slight vacuum is created within the packaging system. Thus, "burping" results in excess atmospheric gas being discharged from the container and thereby reduces the amount of air, and thus oxygen, present inside the container The present invention is related to a packaging system for roast and ground coffee. The packaging system can comprise a container, an overcap, and a visual indicator. The visual indicator can indicate a pressure difference between the inside of the packaging system and the outside of the packaging system. Consumers of roast and ground coffee are keenly aware that a coffee container as described, in order to keep the roast and ground coffee fresh, needs to keep air from coming into the container. Therefore, this visual indicator can provide a simple yet strong visual signal to consumers that the container has been properly closed, burped, is airtight, and is under a slight vacuum.

FIG. 1 details a packaging system 10 in accordance with one embodiment of the present invention. Packaging system 10 generally comprises a container 11 made from a plastic, for example, polyolefin. Packaging system 10 is in general accordance with those disclosed in U.S. Pat. Nos. 7,169,418 and 7,169,419, which are hereby incorporated by reference herein in their entirety. It should be realized that container 11 can take any number of shapes, non-limiting examples including round, square, parallelepiped, and including with or without handles, grips, or pass-through handles, and can be made of any number of suitable materials. Container 11 generally comprises an open top 12, a closed bottom 13, and a body portion 14. Open top 12, closed bottom 13, and body portion 14 define an inner volume in which a product, such as roast and ground coffee, is contained.

With further reference to FIG. 1, container 11 can be cylindrically shaped with substantially smooth sides. In another embodiment, the container is parallelepiped shaped. Handle portions 15 can be respectively formed in container body portion 14 at arcuate positions. Additionally, container 11 can have a protuberance 17 in the form of a rim like structure disposed at the open end of container 11. Protuberance 17 can provide a surface with which to removeably attach a closure 18 and provide a locking surface for skirt portion 32 of overcap 30.

Again referring to FIG. 1, protuberance 17, in the form of a rim like structure, disposed at the open end of container 11 may have textured surfaces disposed thereon. Textured surfaces disposed on protuberance 17 can comprise raised surfaces in the form of protuberances, annular features, and/or cross-hatching to facilitate better sealing of removable closure 19. Annular features may include a single bead or a series of beads as concentric rings protruding from the seal surface of protuberance 17. While not wishing to be bound by theory, it is believed that a textured surface on protuberance 17 can allow for the application of a more uniform and/or concentrated pressure during a sealing process. Textured surfaces can provide increased sealing capability between protuberance 17 and removeable closure 19 due to any irregularities introduced during molding, trimming, shipping processes, and the like during manufacture of container 11. It should be understood that while FIG. 1 and other embodiments disclose a protuberance 17, packaging systems without a protuberance are contemplated and within the scope of this invention.

Further in FIG. 1, packaging system 10 can comprise a closure 18. Closure 18 can be a laminated, peelable seal 19 that can be removeably attached and sealed to container 11. Peelable seal 19 can have a hole beneath, which can be applied a degassing valve, indicated as a hole by reference number 20. One-way valve 20 can be heat welded or glued to peelable seal 19.

Closure 18 can be sealed to container 11 along a rim or protuberance 17 of container 11. Methods of sealing include a heat sealing method incorporating a hot metal plate applying pressure and heat through the closure material and the container rim, causing a fused bond. The peel strength achieved is generally a result of the applied pressure, temperature, and dwell time of the sealing process. However, it should be known to one skilled in the art that other types of seals and seal methods could be used to achieve a bond with sufficient and effective seal strength, including, but not limited to, a plurality of annular sealing beads disposed on rim 17.

Referring again to FIG. 1, packaging system 10 can comprise an overcap 30. Overcap 30 can comprise a dome portion 31, skirt portion 32, and rib 33. Overcap 30 can be configured to be removeably attached to container 11. As a non-limiting example, overcap 30 is generally manufactured from a plastic with a low flexural modulus, for example, linear low-density polyethylene (LLDPE), low-density polyethylene (LDPE), high-density polyethylene (HDPE), polyethylene (PE), polypropylene (PP), linear low-density polyethylene (LLDPE), polycarbonate, polyethylene terephthalate (PET), polystyrene, polyvinyl chloride (PVC), co-polymers thereof, and combinations thereof. This allows for an overcap 30 that has a high degree of flexibility yet can still provide sufficient rigidity to allow stacking of successive containers. By using a flexible overcap 30, mechanical application during packaging as well as re-application of overcap 30 to container 11 after opening by the consumer is facilitated. A feature of a flexible overcap 30, especially a flexible overcap 30 made from a plastic selected from above, although no exclusively, is the ability of the end user to "burp" excess atmospheric gas from container 11 thereby reducing the amount of oxygen present inside the container 11. Additionally, the desired balance of flexibility and rigidity exhibited by overcap 30 is to vary the thickness profile of the overcap 30. For example, the dome portion 31 can be manufactured to be thinner than skirt portion 32 and rib 33.

Dome portion 31 can generally be designed with a curvature, and hence height, to accommodate for an outward displacement of closure 18 from container 11 as a packaged product, such as roast and ground coffee, off gases. The amount of curvature needed in dome portion 31 can be mathematically determined as a prediction of displacement of closure 18. As a non-limiting example, a nominal height of dome portion 31 can be 0.242 inches (0.61 cm) with an internal pressure on closure 18 of 15 millibars for a nominal 6-inch (15.25 cm) diameter overcap. Further, the dome portion 31 can also generally displaceable beyond its original height as internal pressure rises in container 11, causing closure 18 to rise prior to the release of any off gas by a one-way valve 20. While dome portion 31 has been described as designed with a curvature, other embodiments are envisioned that do not have a curvature. A simple flat design may also be appropriate.

Figure 2:
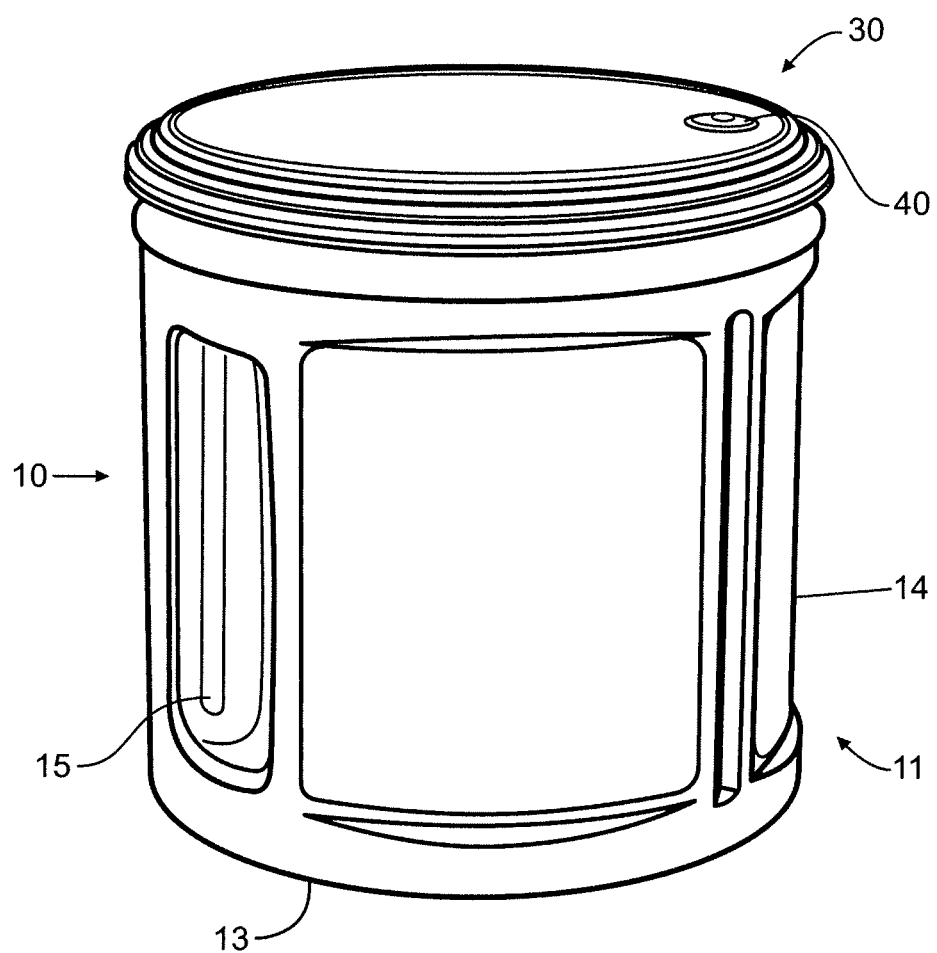
FIG. 2 is a perspective view of the packaging system.
Figure 3:
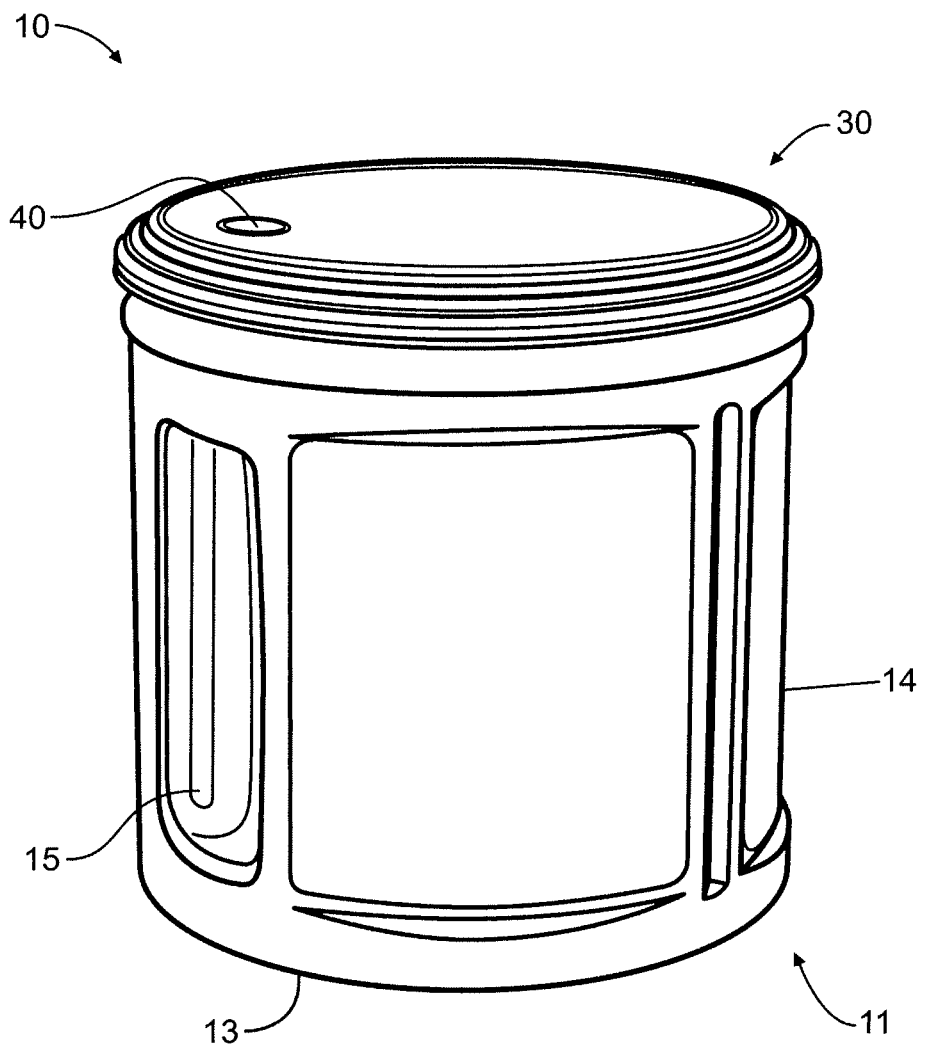
FIG. 3 is a perspective view of a close-up of the packaging system.

FIG. 2 shows a perspective view of packaging system 10 in accordance with one embodiment of the present invention and including a visual indicator 40. In this embodiment, packaging system 10 includes a container 11 comprising a closed bottom 13, body portion 14, a handle portion 15, and an overcap 30. Overcap 30 includes disposed thereon one embodiment of a visual indicator 40. Visual indicator 40, in this particular embodiment, can be integrated within the overcap 30 as a thin, flexible membrane that forms a bubble, which is concave outwardly away from the interior of the container 11 when no vacuum, or pressure differential, exists between the inside, or interior, and outside, or exterior, of the container when the overcap is applied, or removeably attached, to the container. Generally, the visual indicator 40 can comprise a bubble. Thus, when an overcap is applied to the container 11, and not burped, and thus creating no pressure differential between the inside and outside of the container, the visual indicator 40 generally can be in a first position comprising and forming a bubble that is concave outwardly from the inside of the container. Moreover, on a stand-alone overcap that has not been applied to a container 11, visual indicator 40 can comprise and form a bubble. FIG. 3 depicts such an arrangement showing a packaging system 10 that has not undergone "burping" by an end user as evidenced by the visual indicator 40 being concave outwardly from the interior of container 11.

In use, the visual indicator 40 can act as an indicator to a consumer, as follows. When an end user "burps" the packaging system 10, the end user or consumer pushes on the top of overcap 30 of the packaging system 10 to force air out of the container 11 and then subsequently seals or presses on the overcap 30 to apply, or removeably attach, it to the container 11 so that a slight vacuum is created and maintained within the packaging system 10 over time. This slight vacuum indicates that the pressure inside the container is less than the pressure outside of the container. At this point of burping, the visual indicator 40 can generally be in a second position that is concave inwardly, at least partially or completely, towards the interior of the container, indicating that a pressure differential exists in that the pressure inside of the packaging system is less than the pressure outside of the packaging system, specifically that a slight vacuum has been formed inside the container. The visual indicator 40 can also be in a flat position, a substantially flat, a partially flat position along with variations of being partially concave inwardly and partially concave outwardly with or without being flat or substantially flat, if the burping was not performed well enough to form a completely concave inwardly position. In essence, the visual indicator can be in any orientation of configuration depending on the degree of "burping" that has taken place. Thus, "burping" results in excess atmospheric gas being discharged from the container 11 and thereby reducing the amount of air, and thus oxygen, present. Consequently, a vacuum is formed and results in the visual indicator 40 being pulled towards the interior of container 11, by way of less air pressure inside the container than outside the container, and being at least partially concave inwardly. Upon the performance of "burping" by the consumer, the consumer then knows that they have removed at least some air, and thus oxygen, from the container and thus have prepared a friendlier environment for the coffee. Since some oxygen has been removed from the container, less oxidizing of the coffee will take place, leading to a fresher coffee. The visual indicator 40 itself gives the consumer the benefit of knowing that at least some excess air and oxygen is out of the container. It can further give the consumer benefit that no air is coming back into the container by maintaining this position of being concave inwardly. Thus, if for some reason a vacuum is not present within the packaging system, the consumer will be able to identify this situation because the visual indicator 40 will be concave outwardly, and he or she will be able to "burp" the packaging system and thus return the packaging system to a fresher state, one which is under a partial vacuum, as indicated by an inwardly concave visual indicator 40. Therefore, not only can a consumer burp the packaging system on a regular basis, such as every morning when they use the roast and ground coffee contained inside the packaging system, but they can also burp the package if they observe or otherwise notice, at any other time, that the visual indicator 40 is in an outwardly concave position to the interior of the container 11. Accordingly, the consumer can preserve the freshness of the coffee even more so than just during the times of usage of the container when the consumer would ordinarily be "burping" the packaging system.

FIG. 3 details a close up perspective view of packaging system 10 in accordance with one embodiment of the present invention and including a visual indicator 40. Packaging system 10 again includes a container 11 comprising a closed bottom 13, body portion 14, and handle portions 15. Further, visual indicator 40 is shown as being integral with the overcap 30. Visual indicator 40 is shown as being concave outwardly from the interior of the container 11 and thus as a bubble. Again, since the visual indicator 40 is concave outwardly, the packaging system 10 has not been "burped" by an end user or, more specifically, a vacuum is not present inside the container 11.

Figure 4:
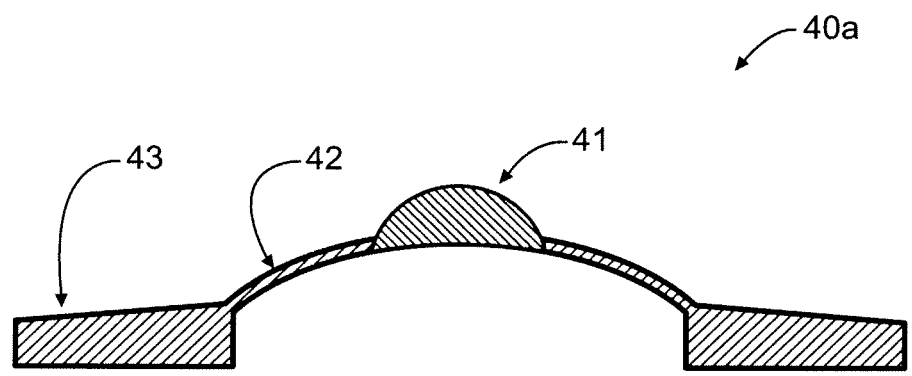
FIG. 4 is a side view of the visual indicator.

The visual indicators disclosed in embodiments of the present invention, discussed hereinbefore and hereinafter, can take any number of configurations. FIG. 4 details a side view of visual indicator 40a in accordance with one embodiment of the present invention. Visual indicator 40a includes a bump portion 41, a bubble portion 42, and an outer ring portion 43. When the visual indicator 40a is in use, and thus the inside of packaging system 10 is under a vacuum, which can occur upon burping by an end user, as hereinbefore described, the bubble portion 42, bump portion 41, or both, can be concave outwardly. Thus, the visual indicator 40a can be configured and designed such that only the bubble portion 42 is concave inwardly upon the presence of a vacuum inside the container, or only the bump portion 41 is concave inwardly upon the presence of a vacuum inside the container, or both the bubble portion 42 and the bump portion 41 are concave inwardly upon the presence of a vacuum inside the container. As before, it could also be the case that each or both portions are only partially concave inwardly.

The outer ring portion 43 can provide a transition from a membrane of the visual indicator 40a to the overcap 30, such that the visual indicator can be integral with the overcap 30 In one instance, the bump portion 41 can force the bubble portion 42 to snap-through in a more pronounced manner when a vacuum inside the container is created than if the bump portion 41 was not included. Without the bump portion 41, as the pressure inside the container increases back to atmospheric pressure, and thus the vacuum subsides to exist, the bubble portion 42 can raise up proportionately. With the bump portion 41, the bubble inverts from being concave outwardly to concave inwardly at a given vacuum but can stay concave inwardly as the pressure rises rather than rise up proportionately, as without the bump portion 41. Thus, two distinct pressures can be created for these two embodiments.

While one embodiment of a bump and bubble configuration is shown in FIG. 4, multiple other configurations are within the scope of this invention as well. Those include bumps and bubbles of all shapes, sizes, and configurations, including generally circular configurations as shown in the Figures as well as other non-limiting examples such as squares, ovals, and triangles.

Figure 5:
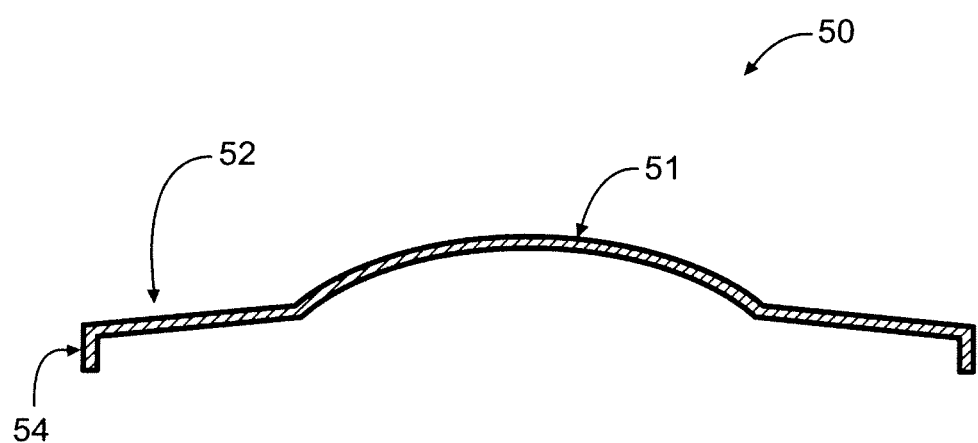
FIG. 5 is a side view of another embodiment of the visual indicator.

At least one other configuration can be represented in FIG. 5. In FIG. 5, visual indicator 50 is shown. Visual indicator 50 includes a bubble portion 51 and an outer ring portion 52. It further includes side portion 54. In this embodiment, which does not include a bump portion as the embodiment of FIG. 4, the bubble portion 51 forms the peak height of the visual indicator 50.

In some embodiments in which the vacuum indicator is integral with the overcap, molding the thin membrane via co-injection molding can be performed. The area of the membrane, and the visual indicator, can be made with a highly flexible material, non-limiting examples including thermoplastic elastomers (TPE), which can help concentrate the effect of the slight vacuum and hence result in a greater deflection of the indicator, making it more obvious to consumers that the container is under a pressure differential and thus under a slight vacuum.

To create an airtight seal between the overcap and the container, and thus to allow a vacuum to form when the packaging system 10 is "burped," a thermoplastic elastomer (TPE) can be used in one embodiment as a gasket or seal at the interface between the overcap and the container. TPE, which is generally known to those skilled in the art as a soft touch material, can be used to create a 100%, or nearly 100%, airtight seal between the container and the overcap. When attached to or formed into the overcap, the TPE can deform and can conform to the container when the overcap is placed on the container, and this arrangement can form a seal to prevent air from entering the package system. Thus, after burping by the consumer, and the visual indicator 40 is in its concave outwardly position, a seal tight arrangement can be formed between the container and the overcap so that no or minimal air enters the container. Should air enter the container such that the vacuum is lost, the visual indicator 40 will transition to its concave outwardly position, indicating that the vacuum indeed was lost, at which time the packaging system can be re-burped.

In other embodiments, the TPE material can be at least partially, or completely, translucent such that it can be used to create a color changing seal. In these embodiments, when intimate contact between the container and overcap exists, the seal at the interface between the container and the overcap can change colors. In one embodiment, for example, wherein the TPE material is blue, and the container portion touching the TPE material is yellow, the seal can turn to a resulting green color. Other color arrangements can be envisioned using any colors for the TPE material and the container such that any resulting color can be formed.

In another embodiment, the visual indicator 40 can be a separate piece that can then be sealed and/or attached to the overcap in a secondary operation. Variations in design and location are contemplated and within the scope of this invention, as optimizing the visual effect of the vacuum indicator can be further objects of placement of the visual indicator. In at least one embodiment, it can be desirable to maximize deflection or inversion of the indicator such that a consumer can easily determine that they have created a pressure differential between the inside of the packaging system and the ambient environment. Thus, optimizing the location of the indicator for consumer visualization is within the scope of this invention.

With respect to manufacturing, container 11, as shown in FIG. 1, can be produced by blow molding a polyolefinic compound. Polyethylene and polypropylene, for example, are relative low cost resins suitable for food contact and provide an excellent water vapor barrier. However, it is known in the art that these materials are not well suited for packaging oxygen-sensitive foods requiring a long shelf life. As a non-limiting example, ethylene vinyl alcohol (EVOH) can provide such an excellent barrier. Thus, a thin layer of EVOH sandwiched between two or more polyolefinic layers can solve this problem. Therefore, the blow-molding process can be used with multi-layered structures by incorporating additional extruders for each resin used. Additionally, the container can be manufactured using other methods, including injection molding and stretch blow molding.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A package, comprising:
   a container having a first color comprising an open top, a closed bottom, and a body portion;
   a flexible overcap configured to be removeably attached to the container and configured to be pressed down on to force air out of the container on a regular basis wherein at least part of the flexible overcap is made of a translucent thermoplastic elastomer;
   a gasket having a second color that is different from the first color comprising a translucent, thermoplastic elastomer residing between the container and the overcap, wherein contact between the gasket and the container creates a color changing seal having the second color, and
   wherein the color changing seal changes to a third color that is different from the first color and the second color when a negative pressure differential exists between the inside of the package and the outside of the package;
   a closure removeably attached to the container and including a one-way valve;
   a visual indicator disposed on and integral with the flexible overcap;
   wherein the visual indicator includes
   a) a bubble portion that is concave outwardly to the interior of the container,
      wherein the bubble portion is at least partially concave inwardly to the interior of the container when a negative pressure differential exists between the inside of the package and the outside of the package, and wherein the bubble portion does not overlap with the center of the flexible overcap,
b) a bump portion residing on the bubble portion, and an outer ring portion encompassing the bubble portion.

2. The package of claim 1 and wherein the overcap is made from a plastic material selected from the group consisting of polycarbonate, low density polyethylene, high density polyethylene, polyethylene terephthalate, polypropylene, polystyrene, polyvinyl chloride, co-polymers thereof, and combinations thereof.

3. The package of claim 1 and wherein the closure comprises a laminated peelable seal.

4. The package of claim 1 and the visual indicator comprises a thermoplastic elastomer.

5. The package of claim 1 and further comprising roast and ground coffee within the container.

6. The package of claim 1, wherein the first color is yellow and the second color is blue and the third color is green.

7. A package comprising:
a container having a first color comprising an open top, a closed bottom, and a body portion;
a flexible overcap having a center, configured to be removeably attached to the container and configured to be pressed down on to force air out of the container on a regular basis wherein at least part of the flexible overcap is made of a translucent thermoplastic elastomer;
a gasket having a second color that is different from the first color comprising a translucent, thermoplastic elastomer residing between the container and the overcap, wherein contact between the gasket and the container creates a color changing seal having the second color, and
wherein the color changing seal changes to a third color that is different from the first color and the second color when a vacuum exists inside the container;
a closure removeably attached to the container and including a one-way valve;
a visual indicator disposed on and integral with the flexible overcap, wherein the visual indicator includes
a) a bubble portion, wherein the bubble portion of the visual indicator does not overlap with the center of the flexible overcap,
b) a bump portion residing on the bubble portion, and
c) an outer ring portion encompassing the bubble portion;
wherein the visual indicator has a first position and a second position, the first position comprising at least one of the bump portion and the bubble portion concave outwardly from the interior of the container, the second position comprising at least one of the bump portion and the bubble portion concave inwardly towards the interior of the container; and
wherein the visual indicator assumes the second position when a vacuum exists inside the container.

8. The package of claim 7 and wherein an air tight seal is formed between the container and the overcap.

9. The package of claim 7, wherein the first color is yellow and the second color is blue and the third color is green.

* * * * *